United States Patent [19]

Sawyer et al.

[11] 4,062,597
[45] Dec. 13, 1977

[54] VEHICLE LOAD SENSING ARRANGEMENTS

[75] Inventors: Patrick Frank Sawyer; Robin Edward Child, both of Birmingham, England

[73] Assignee: Girling Limited, Birmingham, England

[21] Appl. No.: 704,522

[22] Filed: July 12, 1976

[30] Foreign Application Priority Data

July 14, 1975 United Kingdom ............... 29468/75

[51] Int. Cl.² .......................... B60T 8/18; B60T 8/26
[52] U.S. Cl. ................................ 303/6 C; 188/349; 303/22 R
[58] Field of Search ............... 303/6 C, 6 R, 84 A, 303/84 R, 22 R, 22 A, 23; 188/349, 195

[56] References Cited

U.S. PATENT DOCUMENTS

| | | | |
|---|---|---|---|
| 3,191,999 | 6/1965 | Cordiano | 303/22 R |
| 3,837,713 | 9/1974 | Masuda et al. | 303/22 R |
| 3,891,280 | 6/1975 | Severinsson et al. | 303/22 R |
| 3,941,431 | 3/1976 | Giordano et al. | 303/22 R |

FOREIGN PATENT DOCUMENTS 1,350,030  12/1963  France ............................ 303/22 R

*Primary Examiner*—Trygve M. Blix
*Assistant Examiner*—Douglas C. Butler
*Attorney, Agent, or Firm*—Scrivener, Parker, Scrivener & Clarke

[57] ABSTRACT

A vehicle load sensing arrangement for use with a vehicle braking system comprises an input member operating in a first bore and being subjected to the force of a road spring, a spring, such as a robust helical coil spring, subjecting the input member to a force in opposition to the road spring force, a valve having a valve member in a second bore which has a cross-sectional area smaller than the first bore, the valve member and input member being substantially in alignment, and an elastomeric member located between the input member and the valve member. The arrangement is such that only a proportion of the road spring force applied to the input member in excess of the coil spring force is transmitted by the elastomeric member to the valve member, the remainder of that excess force being transmitted to the sprung part of the vehicle.

8 Claims, 5 Drawing Figures

VEHICLE LOAD SENSING ARRANGEMENTS

This invention relates to vehicle load sensing arrangements for vehicle braking systems in which the braking pressure effort is varied in dependence upon vehicle loading.

Normally, such braking systems have a brake pressure control valve, in the form of a pressure-reducing or limiting valve, fitted in the brake line between the rear wheel brakes and the source of fluid pressure. The "cut-in" point at which the valves cut off the pressure fluid to the rear wheel brakes or reduce the pressure relative to the pressure applied to the front wheel brakes is often dependent upon the vehicle loading. The lower rear wheel brake pressure provides a resistance to rear wheel brake locking caused by a reduction in tire-to-road contact forces when the vehicle adopts a nose-down attitude caused by heavy braking, or by certain loading conditions.

The vehicle loading may be sensed by determining relative movement between a sprung and an unsprung part of the vehicle, for example the chassis and the rear axle.

Previously proposed load sensing arrangements comprise a control spring the force of which determines the valve cut-in value for "minimum load" axle position. Only axle deflections above the minimum position are transmitted to the valve and a lever ratio is incorporated which ensures that only a desired proportion of the axle deflection in excess of the minimum position is transmitted to the valve to vary the cut-in point in dependence upon the vehicle suspension deflection.

The road spring (i.e. vehicle suspension spring) and control spring may be fitted in parallel with the road spring directly between the axle and one part of the chassis and the control spring connected to the axle and, through the intermediary of member providing the lever ratio, to another part of the chassis. Alternatively, the road spring and control spring may be connected in series with each other between the axle and the chassis, both springs acting on the means providing the lever ratio. The series arrangement has the advantage that the axle load is measured directly and any adjustments upon assembly and effects of spring settling are eliminated.

In one previously proposed series arrangement for a railway vehicle the lever ratio is provided by a lever pivoted to the chassis and is subjected at a point intermediate its ends to the full load of the road spring which is connected to the axle. The lever is urged into engagement with a valve member of the control valve by the control spring acting in opposition to the road spring. Variations in loading of the vehicle cause changes in the force of the road spring which alter the force on the valve member and thus the valve "cut-in" point. This arrangement has the disadvantage that the lever must be robust to withstand the full load of the road spring.

In another previously proposed series arrangement for railway vehicles the lever ratio is provided by a rubber disc which has on opposed faces pistons of different areas working in respective cylinders. The larger piston is subjected to the full road spring force and a reduced force is transmitted by the rubber disc to the smaller piston which transmits the load to the valve member. In this arrangement there is no control spring to provide a minimum transmitted axle load. The rubber disc is subjected to the full road spring force and has to provide a large lever ratio. However, the hysteresis of the rubber gives rise to inaccuracies in the load transmitted to the valve member and the lever ratio is, in practice, limited. It is also impossible to most cases to achieve the correct axle to valve load relationship without the control spring.

The present invention aims at overcoming the disadvantages associated with the above-mentioned previously proposed arrangements and in accordance with one feature of the invention, there is provided a vehicle load sensing arrangement for use with a vehicle braking system, comprising an input member connected to and subjected to the force of a road spring, resilient means subjecting the input member to a predetermined force in opposition to the road spring force, a valve having a movable operating member for controlling the flow of pressure fluid through the valve, a proportion of the road spring force in excess of the resilient means force being transmitted by the input member to the valve operating member, the remaining force being transmitted to the sprung part of the vehicle, wherein the connections between the road spring and the input member and between the arrangement and the sprung part of the vehicle are substantially coincident with the line of action of the resultant force of the resilient means.

In accordance with another feature of the invention, there is provided a vehicle load sensing arrangement for use with a vehicle braking system, comprising an input member connected to and subjected to the force of a road spring, resilient means subjecting the input member to a predetermined force in opposition to the road spring force, a valve having a movable operating member for controlling the flow of pressure fluid through the valve, a proportion of the road spring force in excess of the resilient means force being transmitted by the input member to the valve operating member, the remaining force being transmitted to the sprung part of the vehicle, wherein a proportion of the road spring force acting in the direction of the axis of the input member is transmitted by the input member to the resilient means.

The resilient means is subjected to the major portion of the load of the road spring and can be suitably robustly constructed whilst taking up less space than the robust lever of the known arrangement. The components of the arrangement of the invention which transmit the excess force may be relatively small and lightly stressed.

A vehicle load-sensing arrangement in accordance with the invention for a braking system will now be described, by way of example, with reference to the accompanying drawings, in which.

Figure 1:
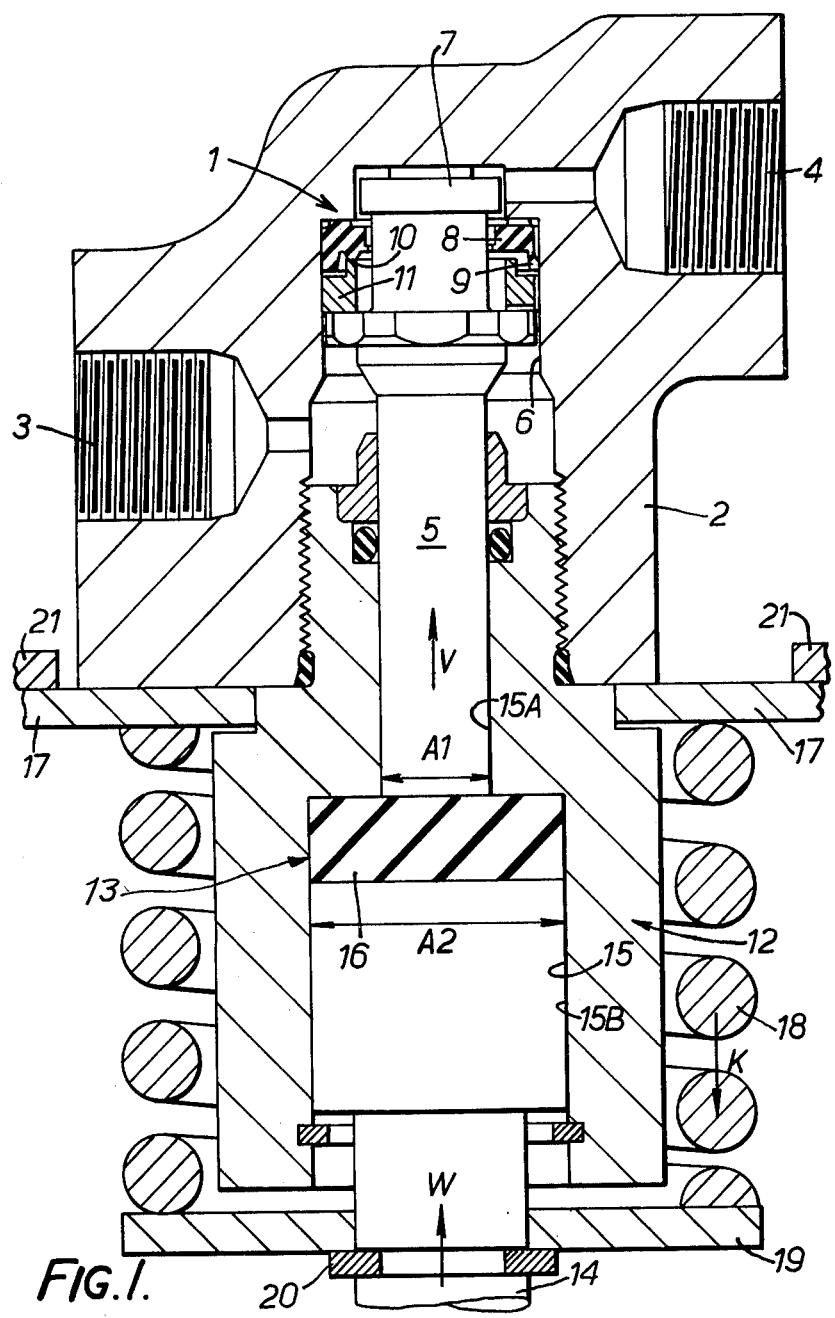
FIG. 1 is an axial section of the sensing arrangement.

The arrangement of FIG. 1 comprises a pressure-reducing or metering valve 1 having a housing 2 with an inlet 3 connected in use to a brake master cylinder and an outlet 4 connected in use to the vehicle rear wheel brakes. A stepped valve member 5 is slidable in a bore 6 in the housing and has a valve head 7 which is engageable with one side of a valve seat 8 to shut off communication between the inlet and the outlet. The valve seat 8 has a peripheral lip 9 normally engaging the bore and circumferentially spaced axial projections 10 which are engaged by an annular retainer 11. The retainer is a force fit in the bore 6 and lightly holds the valve seat against a shoulder of the bore 6 while permitting free flow of fluid through the retainer. The valve is illustrated in its open position.

In normal operation the valve member 5 is subjected to an axial force as will be described later. Fluid flows from the inlet 3 past the projections 10 to the outlet until a cut-in pressure is reached at which the pressure force on the piston overcomes the axial force to move the valve head 7 against the seat 8 and close the valve. Further increases in inlet pressure cause reciprocation of the piston to meter the flow between the inlet and outlet. If the inlet pressure is reduced to a value below the outlet pressure the fluid flows from the outlet past the lip 9 of the valve member to the inlet.

The retainer 11 prevents distortion or twisting of the valve seat 8 due to its engagement by the valve head and ensures that the valve seat is held against the shoulder with its lip engaging the bore when the inlet pressure is greater than the outlet pressure, irrespective of the position of the valve member 5.

The valve housing is sealingly connected to a housing 12 for an assembly 13 which provides a "lever ratio" between an input member 14 and the valve member 5. The housing 12 has a stepped bore 15 within one part 15A of which the valve member 5, having a cross-sectional area A1, is sealingly slidable and in the other part 15B of which a part of the input member having area A2 is located. A block 16 of rubber or other elastomeric material is located between the input member 14 and the valve member 5 in the larger bore part 15B.

Held between the two housings 2, 12 is a plate 17 which serves as a seat for one end of a control spring 18, the other end of which sits on a further plate 19 in force-transmitting engagement through a stop in the form of a circlip 20 with the input member 14. The plate 17 is connected to the vehicle chassis 21.

Figure 2A:
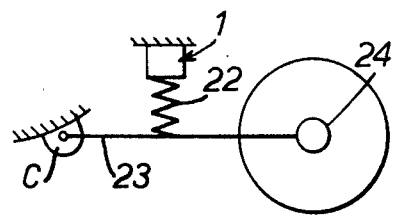
FIGS. 2A to 2C are schematic views of typical installations of the load sensing arrangement of FIG. 1.
Figure 2B:
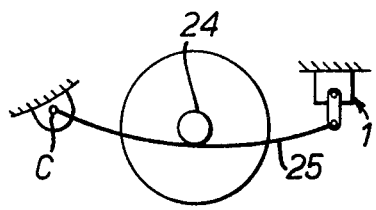
Figure 2C:
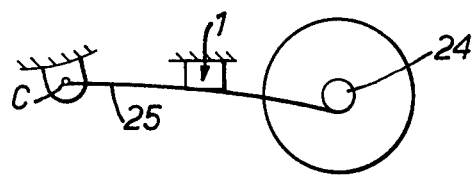

FIGS. 2A to 2C show typical installations and in FIG. 2A the force on the input member 14 is provided by a coil spring 22 which is connected to a member 23 secured to the vehicle chassis at C and to the wheel axle 24 so that variations in loading of the vehicle vary the force of the spring 22 acting on the input member. In FIG. 2B the input member 14 is connected to one end of a leaf spring 25 the other end of which is connected to the chassis, the axle resting on the leaf spring intermediate its ends. In FIG. 2C the leaf spring 25 is connected again at one of its ends to the chassis and supports at its other end the axle, the input member 14 being connected to the spring 25 intermediate its ends.

The line of action of the resultant force of the control spring 18 is coincident with the axis of input member 14, which axis passes through the connection between the housings 2 and 12 of the load sensing arrangement and the plate 17 connected to the chassis 21, and the connection between the input member 14 and the road spring. There is no lever ratio introduced between the road spring and the control spring 18 so that substantially all the road spring force acting on the input member axially thereof is transmitted to the control spring by the input member. The control spring is robust to withstand the higher road spring force.

Figure 3:
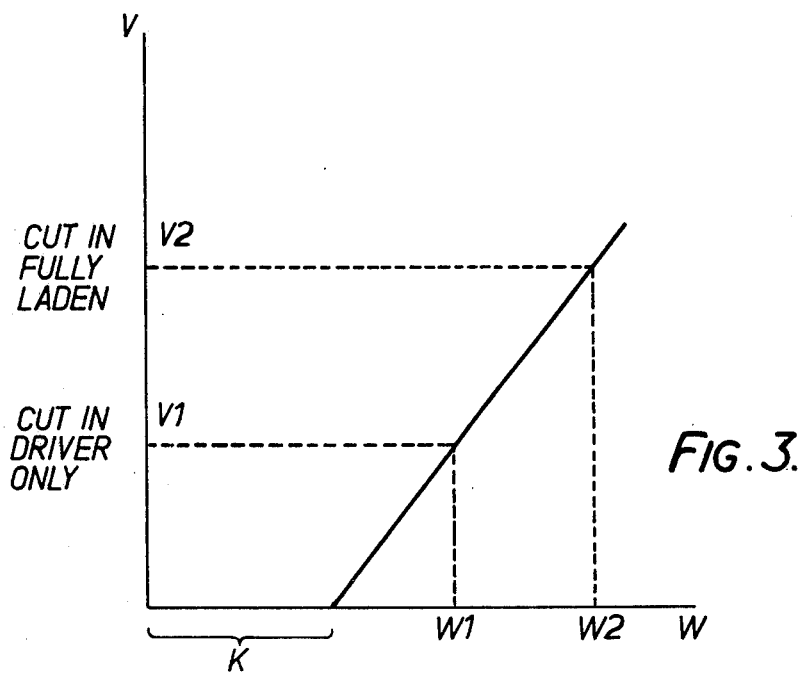
FIG. 3 is a graph of vehicle load versus valve cut-in load.

In operation a force W which is equal to or proportional to the vehicle loading is applied to the input member 14 and that force is transferred directly through the control spring 18 and the plate 17 to the chassis. When the force W reaches a predetermined value K, which is the force of the control spring, any further increase in W compresses the rubber block 16 and urges it into the smaller diameter bore part 15A to transfer a proportion of the input force to the valve member 5 and thus change the "cut-in" point of the valve. The proportion of the force transferred to the input member is A1/A2, the remaining force being transferred through the housing 12 to the chassis. The operation is represented in the graph shown in FIG. 3. The force on the valve member 5 is unchanged until the loading of the vehicle is sufficient to overcome the force K of the control spring, after which the loading of the valve member increases proportionately to the loading on the input member, as shown by the straight line in the graph. When the vehicle has only the driver aboard the loading is W1 and the force on the valve member is V1. The cut-in valve inlet pressure is then less than when the vehicle is fully laden, having a load W2 providing a force on the valve member of V2. From the graph the loading of the vehicle V = (W−K) (V2−V1)/(W2−W1).

Since the loading on the input member is in proportion to the input load in excess of the control spring force, V = (W−K) A1/A2. From these equations the areas of the valve member 5 and the input member 14 can be calculated for given loading and brake presssure requirements.

Although described above with a pressure-reducing valve, the arrangement could be used with pressure-limiting valves in which pressure to the rear brakes is cut off completely when the loading on the valve member reaches a predetermined value. Furthermore, the valve member could merely be used to operate an "on-off" valve to pass pressure fluid to a pressure conscious brake pressure regulating valve.

What we claim is:

1. In or for a vehicle having an unsprung part and a sprung part and road spring means between said parts, a vehicle load sensing arrangement for a vehicle braking system, said arrangement comprising means defining a first bore, an input member slidably operating in said first bore and being subjected to the force of said road spring means, a stop formed on said input member, a plate engageable with said stop, resilient means having two opposed ends, one end of said resilient means engaging said plate to urge it into engagement with said stop, said resilient means applying a predetermined force which is transmitted through said plate and said stop to said input member in opposition to said road spring means, and the other end of said resilient means engaging said sprung part of said vehicle, means defining a second bore having a cross-sectional area less than said first bore, a valve having a valve member slidably operating in said second bore and movable to control the flow of pressure fluid through said valve, said input member and said valve member being substantially in alignment, and elastomeric means located between and engaging said input member and said valve member and being capable of being urged into said second bore, whereby only a proportion of the force of said road spring means applied to said input member in excess of said resilient means force is transmitted by said elastomeric means to the said valve member, the remaining proportion of said excess force being transmitted to said sprung part of said vehicle.

2. A load-sensing arrangement according to claim 1, wherein the resilient means comprises a control coil spring which is coaxial with said input member.

3. A load-sensing arrangement according to claim 2, wherein said coil spring surrounds said input member.

4. A load-sensing arrangement according to claim 2, wherein said road spring means is a coil spring and said control spring are in axial alignment.

5. A load-sensing arrangement according to claim 1, wherein said input member is connected directly to said road spring means.

6. A load-sensing arrangement according to claim 1, wherein said valve is a metering valve.

7. A load-sensing arrangement according to claim 1, wherein said road spring means comprises a coil spring acting directly on the input member.

8. A load-sensing arrangement according to claim 1, wherein said road spring means comprises a leaf spring which is in engagement with said input member.

* * * * *